(12) United States Patent
Barron

(10) Patent No.: US 12,311,858 B2
(45) Date of Patent: May 27, 2025

(54) VEHICLE SAFETY GUARD SYSTEM WITH HEIGHT ADJUSTMENT

(71) Applicant: PUBLIC TRANSPORTATION SAFETY INT'L CORP., Los Angeles, CA (US)

(72) Inventor: Mark B. Barron, Bel Air, CA (US)

(73) Assignee: PUBLIC TRANSPORTATION SAFETY INT'L CORP., Los Angeles, CA (US)

( * ) Notice: Subject to any disclaimer, the term of this patent is extended or adjusted under 35 U.S.C. 154(b) by 0 days.

(21) Appl. No.: 18/578,776

(22) PCT Filed: Jul. 14, 2022

(86) PCT No.: PCT/US2022/037096
§ 371 (c)(1),
(2) Date: Jan. 12, 2024

(87) PCT Pub. No.: WO2023/287965
PCT Pub. Date: Jan. 19, 2023

(65) Prior Publication Data
US 2024/0383427 A1 Nov. 21, 2024

Related U.S. Application Data

(60) Provisional application No. 63/222,061, filed on Jul. 15, 2021.

(51) Int. Cl.
*B60R 19/54* (2006.01)
*B60R 19/56* (2006.01)
*B60R 21/34* (2011.01)

(52) U.S. Cl.
CPC ............ *B60R 19/54* (2013.01); *B60R 19/565* (2013.01); *B60R 21/34* (2013.01)

(58) Field of Classification Search
CPC .......... B60R 19/54; B60R 21/34; B60R 19/56
See application file for complete search history.

(56) References Cited

U.S. PATENT DOCUMENTS

| | | | |
|---|---|---|---|
| 4,093,290 A | 6/1978 | Pearson | |
| 4,249,632 A | 2/1981 | Kramer | |
| 4,300,116 A | 11/1981 | Stahovec | |
| 4,688,824 A * | 8/1987 | Herring | B60R 21/34 293/38 |

(Continued)

FOREIGN PATENT DOCUMENTS

| | | |
|---|---|---|
| CN | 110001564 | 7/2019 |
| GB | 2579076 | 6/2020 |

(Continued)

*Primary Examiner* — Paul N Dickson
*Assistant Examiner* — Tiffany L Webb
(74) *Attorney, Agent, or Firm* — Diedericks & Whitelaw, PLC

(57) ABSTRACT

A safety guard attached to and extending down from a body portion of a vehicle can pivot against a biasing force relative to the body portion if the safety guard engages an animate or inanimate object. In addition, the safety guard is mounted for vertical movement relative to the vehicle body and a support surface for the vehicle, with the vertical movement being selectively performed by an operator of the vehicle or automatically based on sensor inputs used to assess road and/or vehicle operating conditions.

20 Claims, 3 Drawing Sheets

(56) References Cited

U.S. PATENT DOCUMENTS

| | | | |
|---|---|---|---|
| 4,779,095 A | 10/1988 | Guerreri | |
| 4,877,266 A * | 10/1989 | Lamparter | B60R 19/565 |
| | | | 293/118 |
| 4,956,630 A | 11/1990 | Wicker | |
| 5,132,662 A | 7/1992 | Burch | |
| 5,148,886 A * | 9/1992 | Parsons | B60K 28/14 |
| | | | 180/275 |
| 5,313,189 A * | 5/1994 | Dodd | B60Q 9/008 |
| | | | 340/905 |
| 5,462,324 A | 10/1995 | Bowen | |
| 5,735,560 A | 7/1998 | Bowen | |
| 6,007,102 A | 12/1999 | Helmus | |
| 6,601,669 B1 | 8/2003 | Agnew | |
| 6,814,378 B1 | 11/2004 | Marmur | |
| 7,793,985 B1 * | 9/2010 | Coloma | B62D 25/168 |
| | | | 280/848 |
| 7,905,314 B2 | 3/2011 | Mathevon | |
| 8,505,943 B2 | 8/2013 | Barron | |
| 8,567,802 B2 | 10/2013 | Barron | |
| 8,602,466 B2 | 12/2013 | Barron | |
| 9,102,290 B1 | 8/2015 | Cuddihy | |
| 9,365,176 B2 | 6/2016 | Revankar | |
| 9,457,748 B1 | 10/2016 | Kaufmann | |
| 9,550,464 B2 | 1/2017 | Revankar | |
| 9,676,367 B2 | 6/2017 | Barron | |
| 10,118,585 B2 * | 11/2018 | Barron | B62D 25/02 |
| 10,189,517 B2 * | 1/2019 | Povinelli | B62D 35/008 |
| 10,207,672 B2 | 2/2019 | Barron | |
| 10,457,340 B2 | 10/2019 | Potvin | |
| 10,486,592 B2 | 11/2019 | Irby | |
| 10,696,253 B2 | 6/2020 | Barron | |
| 11,414,140 B2 * | 8/2022 | Povinelli | B62D 35/008 |
| 2005/0017519 A1 | 1/2005 | Regnell | |
| 2007/0067081 A1 | 3/2007 | Ton | |
| 2018/0056926 A1 | 3/2018 | Barron | |
| 2021/0246708 A1 | 8/2021 | Mönig | |

FOREIGN PATENT DOCUMENTS

| | | |
|---|---|---|
| JP | 2005138750 | 6/2005 |
| JP | 2005329833 | 12/2005 |
| KR | 19980046535 | 9/1998 |
| KR | 101082112 | 11/2011 |
| KR | 101801179 | 12/2017 |
| TW | I707794 | 10/2020 |
| WO | 9420333 | 9/1994 |
| WO | 2023022900 | 2/2023 |
| WO | 2023023120 | 2/2023 |

* cited by examiner

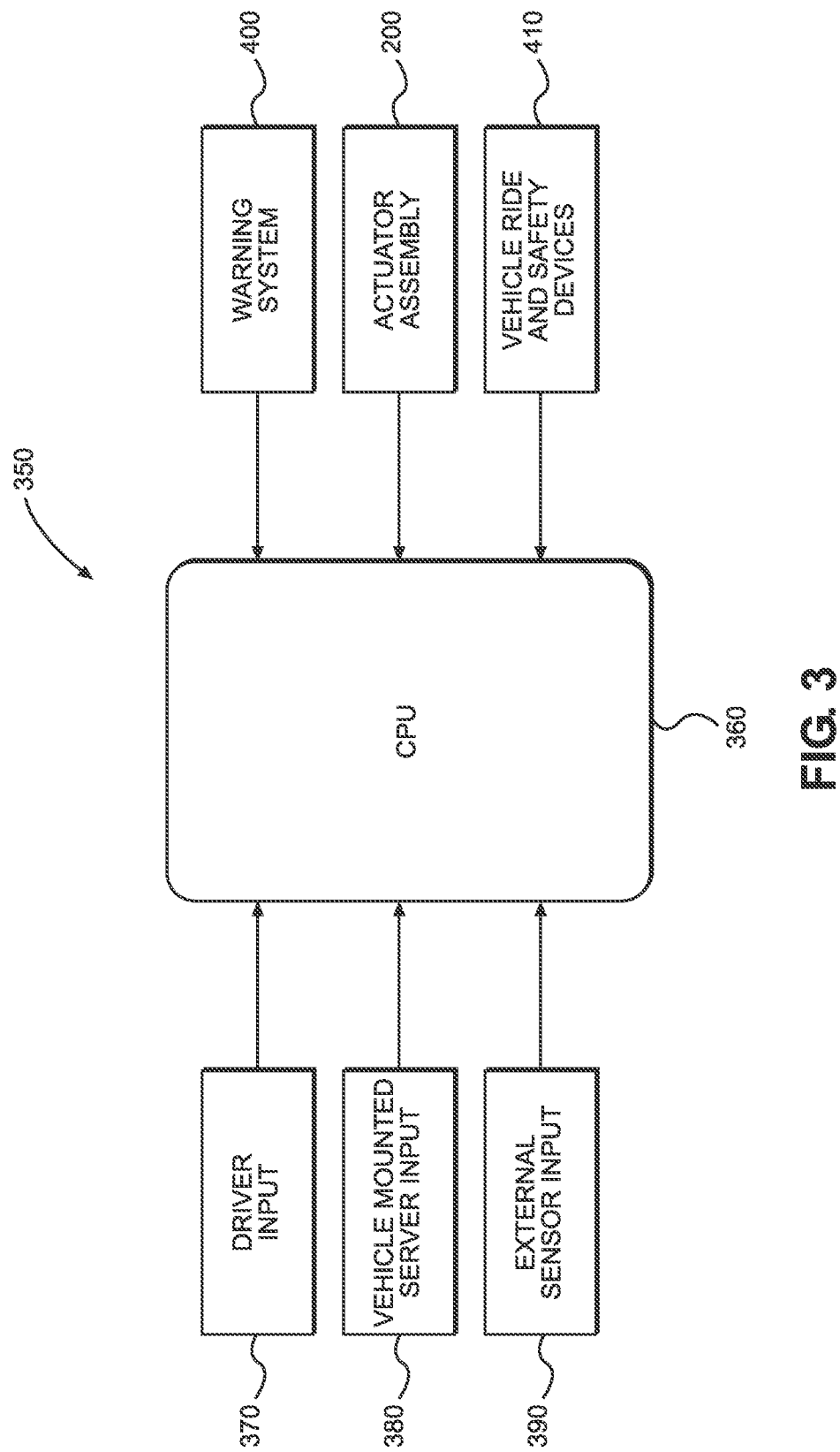

VEHICLE SAFETY GUARD SYSTEM WITH HEIGHT ADJUSTMENT

CROSS-REFERENCE TO RELATED APPLICATIONS

This application represents the U.S. National Phase of International Application number PCT/US2022/037096 filed on Jul. 14, 2022, which claims the benefit of U.S. Provisional Patent Application No. 63/222,061 filed Jul. 15, 2021 and entitled "Vehicle Safety Guard System with Height Adjustment". The entire content of this application is incorporated herein by reference.

BACKGROUND OF THE INVENTION

Field of the Invention

The present invention pertains to the art of vehicle safety devices and, more particularly, to a safety guard system mounted to and extending downward from one or more portions of a vehicle for engaging animate and inanimate objects in order to prevent the objects from going under the vehicle. Overall, the safety guard system includes a guard portion which will not only deflect animate and inanimate objects away from the vehicle but can be selectively and/or automatically vertically adjusted relative to a body of the vehicle to, for example, accommodate road obstructions or even variations in a vehicle support surface.

Discussion of the Prior Art

For a range of reasons, various transportation vehicles are designed with rather high ground clearances. For instance, school and commuter buses, as well as personal recreation vehicles, can have associated high ground clearances. Unfortunately, there are inherent dangers associated with the operation of vehicles with high ground clearances that are not found in other vehicles which have low ground clearances. The most serious of these injuries is a result of an individual slipping and falling in the road in front of the vehicle, resulting in the vehicle running over the individual. In addition, inanimate objects can undesirably run over and crushed by such a vehicle.

To address these concerns, it has been proposed in the art to mount a safety guard directly in front of wheels on a bus to establish a safety barrier between the wheels and objects. More specifically, as represented by U.S. Pat. Nos. 5,462,324 and 5,735,560, it is known to mount a safety barrier to undercarriage structure of a vehicle, such as a bus, with the safety barrier including a lower edge extending directly along a ground surface. The safety barrier is fixedly supported at various locations, such as to axle, frame and/or suspension structure. The safety barrier is angled such that, if an object is encountered during movement of the bus, the safety barrier forces the object out from under the vehicle to a position out of the path of the vehicle wheels.

Although there exist vehicle safety guards, there is still seen to exist a need for a safety guard system which exhibits enhanced mounting and operation for guard protection purposes, thereby establishing a long lasting, effective, potentially lifesaving safety system for use on a wide range of vehicles having rather high ground clearances, particularly by selectively and/or automatically accommodating variations on the support surfaces over which the vehicle travels.

SUMMARY OF THE INVENTION

The present invention is directed to providing a vehicle safety guard system mounted to and extending downward from select body portions of a vehicle, such as a high clearance school or commuter bus or a personal recreational vehicle, wherein the safety guard functions to prevent animate objects from going under the vehicle while also being vertically adjustable to vary the distance between the safety guard and the supporting surface over which the vehicle travels. Overall, the safety guard functions to engage and deflect individuals or other animate objects lying in the path of the vehicle, thereby preventing the individuals or other animate objects from being run over by the vehicle. For this purpose, the safety guard extends down from a body portion of the vehicle, such as below the front bumper and/or between the front and rear wheels along a side of the vehicle, to just above the vehicle support surface, e.g., in the range of about 3 inches or less from the support surface.

In accordance with certain embodiments of the invention, the safety guard can be pivotally attached to and extend down from the body portion of the vehicle to just above the vehicle support surface such that the entire safety guard can pivot, generally about a first axis and against a biasing force, relative to the vehicle body if the safety guard engages an extremely heavy or fixed object, such as a curb, thereby avoiding undue damage to the safety guard. However, most importantly, the safety guard is mounted for vertical movement relative to the vehicle body and the support surface in order to preferably avoid engagement with such potentially damaging objects. This vertical movement can be selectively performed by an operator of the vehicle or automatically based on signals from sensors used to assess road conditions.

More specifically, the vertical adjustment can be performed either manually or automatically. With manual adjustment, the vehicle operator can activate a series of actuators used to selectively move the safety guard up or down, such as based on the operator simply viewing upcoming road conditions or by reading or hearing an audible message from a sensing system of the upcoming road conditions. On the other hand, the sensing system can be part of an overall computerized monitoring system which functions to evaluate variations in the road in front of the vehicle, including loose debris or fixed objects, and automatically raises the safety guard as necessary to clear such objects and then returns the safety guard to its normal operational height.

With this overall construction, an individual who slips and falls under the vehicle or in the vehicle's path will engage the safety guard and be prevented from going completely under the vehicle. Although the safety guard can be pivotally mounted, the guard would be biased against pivotal movement about a substantially horizontal axis, thereby establishing a dampening effect which not only enhances safety for the individual by providing a certain degree of cushioning but also minimizes damage to the safety guard if/when the guard encounters a heavy or fixed object such as a curb. Regardless, the safety guard of the present invention can be manually or automatically shifted vertically to advantageously avoid any damaging objects, fixed or otherwise.

Additional objects, features and advantages of the present invention will become more readily apparent from the following detailed description of preferred embodiments when taken in conjunction with the drawings wherein like reference numerals refer to corresponding parts in the several views.

BRIEF DESCRIPTION OF THE DRAWINGS

FIG. 3 is a block diagram of a system for controlling the vertical movement of the safety guard.

DETAILED DESCRIPTION OF THE INVENTION

Figure 1:
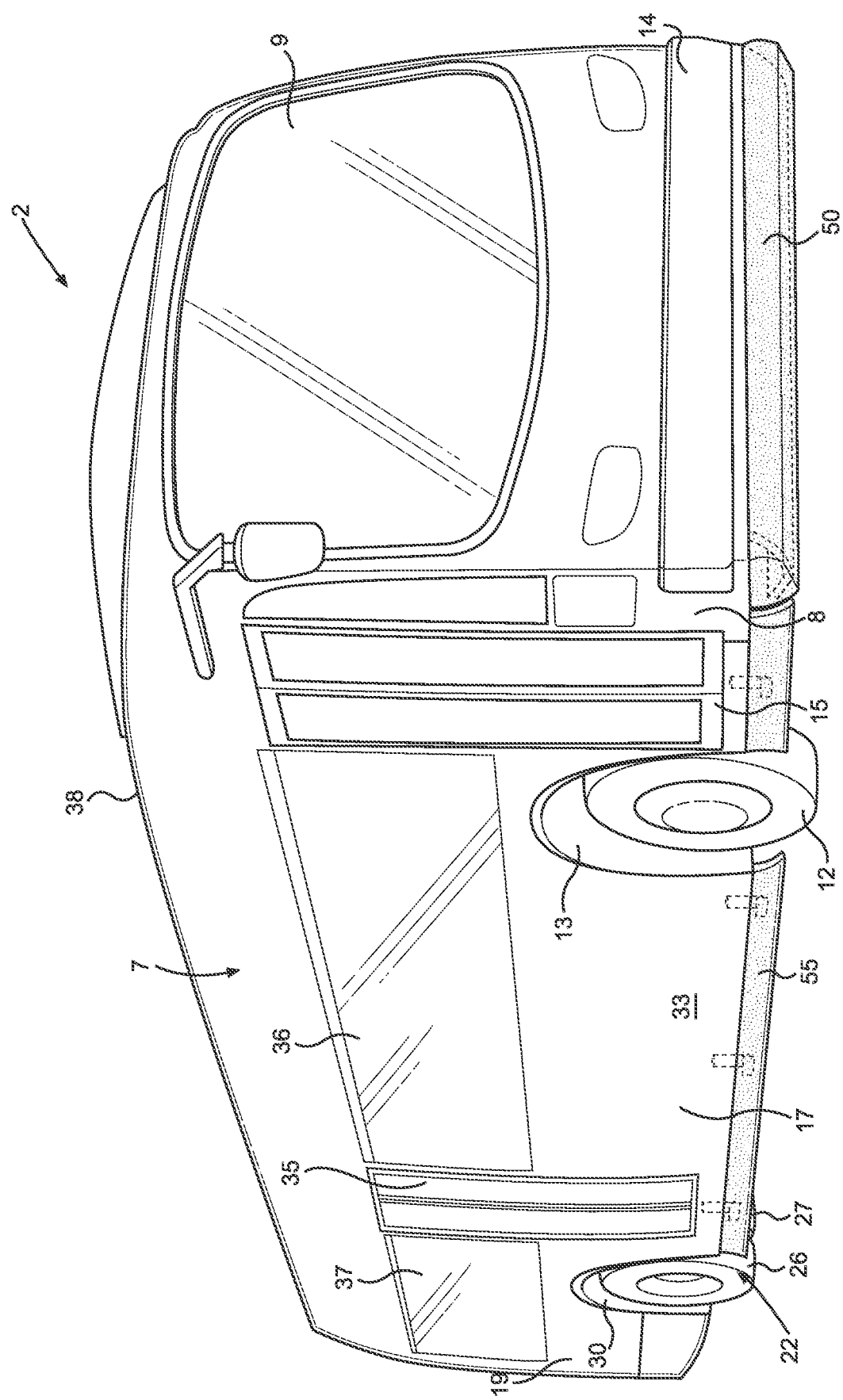
FIG. 1 is a perspective view of a commuter bus-type vehicle having mounted thereto a safety guard system in accordance with an embodiment of the invention.

With initial reference to FIG. 1, a vehicle 2, shown as a commuter bus, including a body 7 having a front end 8 having a windshield 9, front steerable wheels one of which is shown at 12 within a wheel well 13, and a front bumper 14. Arranged directly forward of front wheel 12 is shown a forwardmost side door 15. Body 7 also includes a middle section 17 and a rear end section 19. Supporting rear end section 19 is a pair of rear wheel assemblies, one set of which is shown at 22 to include dual wheels 26 and 27 arranged in a wheel well 30 created in a side panel 33 of vehicle body 7. Just in front of rear wheel assembly 22 alongside panel 33 is a rearmost side door 35. Also provided in side panel 33 are various fore-to-aft spaced windows 36 and 37 which are vertically arranged below a roof 38. In accordance with the present invention, vehicle 2 includes one or more safety guards which are, at the very least, vertically adjustable. More specifically, in the exemplary embodiment shown in FIG. 1, a front safety guard 50 is shown fixed to and extending downward from front end 8 below bumper 14 and at least one side safety guard 55 extends below side panel 33 between front and rear wheels 12 and 22.

Although also applicable to more low riding buses, the front and side safety guards 50 and 55 of the invention are considered to be particularly advantageously employed in connection with vehicles which have undercarriage body portions that are raised quite high, such as many school, commuter, cross-country and recreational buses. In rather high ground clearance vehicle 2, the ground clearance of bumper 14 can be even up to two feet, while each of safety guards 50 and 55 in accordance with the invention reduces this distance to in the order of 2-6, and preferably about 3 inches or less. In most preferred embodiments, safety guards 50 and 55 are preferably formed of a highly durable, impact resistant urethane material that is abrasion resistant, corrosion proof, smooth to the touch and color fast, although other known materials, including plastic, rubber and the like, could be used to create a physical barrier strong enough to prevent a child or adult from going under body 7 between front wheels 12 or between front and rear wheels 12 and 22. In addition, it would be possible to manufacture at least a portion of safety guard 50 or 55 from recycled tire rubber or fiberglass. To reduce the weight and thickness of the safety guard 50 or 55, it is possible to employ an inner wire mesh for internal strengthening without sacrificing overall effectiveness.

At this point, it should be recognized that safety guards 50 and 55 mount to and extend downward from different portions of vehicle 2 for engaging animate and inanimate objects in order to prevent the objects from going under vehicle 2. With this in mind, note how frontal safety guard 50 is designed to not only extend along front end 8 below bumper 14 but also wraps around so as to extend below forwardmost side door 15, basically to a front portion of wheel well 13. On the other hand, safety guard 55 extends below side panel 33 essentially entirely between wheel wells 13 and 30 of front and rear wheels 12 and 22 respectively. Therefore, between safety guard 50 and safety guard 55, the entire areas across the front and side of vehicle 2 are protected. Regardless, for purposes of the invention, one or more of safety guards 50 and 55 can be provided and each guard 50, 55 can actually be formed of one or more pieces. The particular mounting of safety guard 50 and/or 55 to body 7 can greatly vary in accordance with the present invention, while preferably accommodating the compliant, and certainly the vertical shifting configuration referenced above. Still, for purposes of explaining details of the invention, reference will be made to the mounting and operation of a portion of safety guard 55 and it is to be understood that a corresponding mounting and operation can be employed in connection with safety guard 50.

Figure 2:
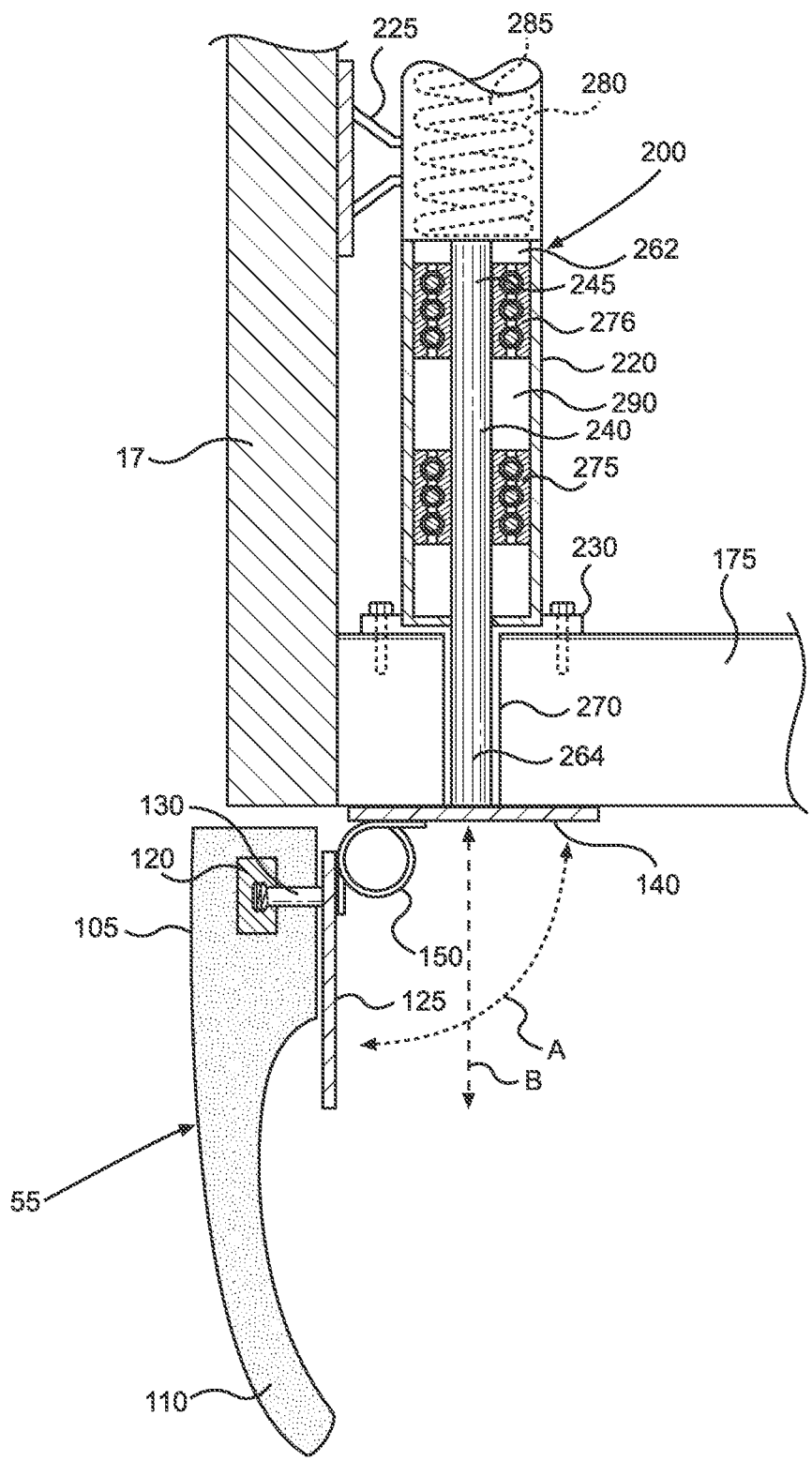
FIG. 2 is a partial cross-sectional view of a side body portion of the vehicle showing and embodiment wherein the safety guard is both pivotally and vertically shiftable.

With specific reference to FIG. 2, an enlarged cross-sectional view taken along a portion of middle section 17 of body 7 is provided to illustrate one preferred mounting arrangement for safety guard 55 in connection with a full understanding of the invention. Although both a combination pivotal and vertically shiftable mounting arrangement is shown, it should be noted that the accommodated pivotal movement is preferred, but not required. In any case, safety guard 55 basically establishes a barrier in the form of a skirt extending between front and rear wheels 12 and 22, with safety guard 55 including an upper portion 105 which reduces or tapers to a lower portion 110. As indicated above, although safety guard 55 can be made of various materials, preferably a plastic or elastomeric material (most preferably urethane) is employed, with the material being preferably molded about an elongated internal support member 120, such as a metal bar. Secured to support member 120 is one or more first, fore-to-aft or longitudinally extending mounting components 125, each of which takes the form of a plate or bracket, through the use of fasteners, one of which is shown at 130 extending through first mounting component 125 and into support member 120. The first mounting components 125 are interconnected to various longitudinally spaced second mounting components, one of which is shown as a plate at 140, through respective springs 150. With this mounting arrangement, safety guard 55 can pivot laterally inward of vehicle 2 as indicated by arrow A in FIG. 2, such as in the event safety guard 55 hits an immovable object, such as a curb or speed bump. However, springs 150 are strong enough to withstand forces associated with a person or animal before deflecting.

Particularly important in connection with the present invention is the ability to vertically shift safety guard 55 as indicated by arrows B in FIG. 2. Although the overall assembly could be structured in various ways, FIG. 2 shows an arrangement wherein each second mounting component 140 is connected to a frame member 175 of vehicle body 7 through an actuator unit or assembly 200. In the embodiment shown, actuator assembly 200 defines a linear actuator including a housing 220 which takes the form of a cylinder fixed to vehicle body 7 through an upper bracket 225 and a lower bracket 230, shown in this embodiment to be bolted to frame member 175. Certainly, various types of actuator assemblies, including electric motors, magnetic, servos or the like, could be employed. As shown, actuator assembly 200 also includes a shaft or rod 240 having a first end portion 245 provided with a piston 262 shiftably mounted within housing 220 and a second end portion 264 which extends through a bushing 270 and frame member 175 and then is fixedly secured to second mounting component 140. Between piston 262 and second mounting component 140, within housing 220, various bearing or guide sleeve units 275 and 276 are provided to support shaft 240 for linear movement relative to housing 220.

Above piston 262 within an upper chamber 280 of housing 220 is a spring 285 which biases piston 262 in the downward direction. The biasing force of spring 285 is countered by an adjustable fluid pressure, which could be pneumatic but is preferably hydraulic, within a lower chamber 290 of housing 220. At this point, it should be recognized that, in the fully raised operative position shown in FIG. 2, spring 285 is tending to lower shaft 240 and, accordingly, safety guard 55. On the other hand, the fluid pressure in lower chamber 290 is compressing spring 285 to position safety guard 55 in the shown raised position. If it is desired to allow safety guard 55 to lower to a more normal operative position, i.e., spaced from a ground or vehicle supporting surface by a distance less than the height of standard curb 140 (with a curb being generally in the order of 4-6 inches or about 10-15 cm in height), basically in the order of 2-4 inches (preferably about 3 inches) above the supporting surface or road for vehicle 2, this merely requires lowering the fluid pressure within lower chamber 290. Given that spring 285 is already compressed, the lowering of safety guard 55 can be quite regulated with spring 285 providing an operational shock absorbing function.

With this mounting arrangement, the inclusion of a pivotal connection allows safety guard 55 to shift inward relative to vehicle body 7. More importantly in accordance with this invention, safety guard 55 can shift vertically relative to vehicle body 7. Therefore, these movements can be performed either individually or in combination along multiple, distinct axes. Even though the pivoting movement can be optional in accordance with the broader aspects of the invention, it is worth mentioning that provisions can be made to prevent pivoting of safety guard 55 clockwise beyond the operational position shown in FIG. 2. As shown, springs 150 accomplish this function, but a wide range of other structure could be employed. For instance, one or more additional linkages, clamps, brackets or the like could be employed or, in simple forms, a stop member (not shown) could simply be employed or even a tether between first and second mounting components 125 and 140. In any case, it should be readily recognized that different mounting arrangements could be employed while still accommodating the desired pivotal and vertical movement. In addition, although housing 220 and shaft 240 are shown as cylindrical so as to have generally circular cross-sections, these components could actually be polygonal in cross-section while still accommodating the desired, limited relative movement. Furthermore, different arrangements could be utilized to provide for the vertical movement, such as both employing dual (upper and lower) fluid chambers for actuator assembly 200 (with or without associated chamber springs) or reverse the configuration shown in FIG. 2 to include spring 285 in lower chamber 290 and adjustable fluid pressure in upper chamber 280. Therefore, it is simply important to be able to vertically shift safety guard 55 in accordance with the invention, as needed, particularly to avoid engaging contact with inanimate objects, such as a curb or an obstruction in the roadway. This vertical shifting can be performed selectively by an operator of vehicle 2 while viewing road conditions ahead of the traveling vehicle and/or automatically based on sensory inputs as will now be described in detail with particular reference to FIG. 3.

A system 350 for controlling the vertical height of safety guard 55 includes a controller or CPU 360 mounted on vehicle 2. The features performed by controller 360 can be integrated into a main vehicle controller or linked to the same. In any case, controller 360 is used to output control signals to each actuator assembly 200. The control signals can be established in various ways. In the simplest electronic form, the vehicle driver can introduce inputs at 370, such as through a lever or buttons, to indicate a desire to raise or lower safety guard 55. For instance, the operator can simply view the road ahead, either directly or from one or more camera monitors, for vehicle 2 and, if an obstruction is observed which may damage safety guard 55, the operator can raise safety guard 55 through input 370. After the obstruction is passed, either another input 370 or the ceasing of an input 370 will cause safety guard 55 to assume its normal operational height. In the alternative or as a user selectable option, the height control can be performed automatically based on sensed conditions, e.g., based on signals from vehicle mounted sensor input 380 and/or external sensor input 390.

In connection with vehicle mounted sensor input 380, vehicle 2 can be provided with a range of sensors, including a series of cameras, light lasers, sonar, radar or any other known type of object/terrain sensors, with controller 360 functioning to automatically adjust the height of safety guard 55 based on the signals received. In connection with external sensor input 390, various remotely signaling control scenarios are possible. For instance, when a speed bump is installed on a road, a signal unit could also be installed to output signals which are picked up as external sensor input and used by controller 360. Signals can also be sent based on satellite imaging or even from an app supplied with obstruction information provided by individual cell phones. Information on fixed obstructions can be stored in a database and accessed by controller 360 based on the vehicle route to be taken. Such data can be stored on controller 360 or available from signals received from a remote station. Also, position and speed data regarding vehicle 2 could be logged and recorded so that vertical shifting of safety guard 55 on future travels over the same road can be based on actions taken on a previous trip. Update instructions can be uploaded, preferably by wireless transmission like Wi-Fi, Bluetooth, NFC, RFID, Satellite, etc., with remote height information and instructions provided by region, gradient maps or collected data for changing conditions.

In addition to the output to actuator units 200, controller 360 is also preferably linked to a warning system 400 which can signal a change in the operating state of vehicle 2. For instance, pedestrians, bike riders and the like in the immediate vicinity of vehicle 2 can be warned whenever the safety guard 55 is raised. Such a warning can equate to the illumination of warning lights, but audible and other visual signals could be provided. The warning (e.g., alert sounds, notifications, announcements, etc.) can be extended to passengers as well, since the obstruction may alter ride comfort which could easily be forewarned. In this context, controller 360 can also be linked to other vehicle control systems at 410, such as air bags, adjustable suspension components, a tire pressure system and the like, in order to basically share data on the road conditions. The warning system can also be based on video (i.e., one or more cameras on vehicle or guard) taken near the guard. Preferably, the signals would be sent to the operator's dashboard and also recorded for future use. Live video can also be made available to riders for educational purposes in connection with the danger associated with loading and unloading people. The video could also be used to monitor a driver's safety performance and capture various types of vehicle incidents.

Based on the above, it should be readily apparent that the invention establishes a physical barrier or guard mounted securely to the undercarriage, body, frame, chassis, etc. which closes a potentially dangerous gap from below a front bumper and/or a rocker panel to a road surface to prevent pedestrians, cyclists and the like from entering the undercarriage of the vehicle in order to prevent injury or fatalities caused by the person being run over by the front or rear wheels. Important to the invention, the guard can be vertically move up and down by an operator while viewing road conditions ahead and/or by sensor captured information based on laser, optical, radar, sonar, and other monitoring arrangements that would enable the road surface to be read for the purpose of adjusting the ride height of the barrier. The sensors can also send feedback signal used to adjust the response of the height control system, such as through vibrations, sound waves and the like. Once the barrier is positioned for safety, the barrier will move inward from curb or other immovable object impact, but also up and down, mainly to keep a constant ride height, while preventing the barrier from hitting potentially damaging bumps in the road, so that a uniform level of protection can be maintained below the undercarriage. The safety guard ride height system can be self-contained on the vehicle or connected to a network cloud system that could also be used in conjunction to provide computerized monitoring and reporting, and potentially also make adjustments using artificial intelligence, machine learning, computer vision and the like. The system could also sense and report road conditions, such as surface temperature, composition and maintenance issues to the appropriate city, state or federal agency, for data collection and monitoring. The sensors of the barrier ride height sensor system can also provide feedback to the vehicle regarding suspension components, such as air bags, shocks, springs, tire pressure and the like, as well as feedback on any sensed fault, failure, possible failure or need for maintenance. For instance, embedded sensors in the guard could be employed to automatically trigger notifications to the vehicle operator or other supervisory or transit authority that the guard needs to be replaced because of wear or damage. These or other sensors could also signal excessive, potentially damaging collisions with the guard, such as with curbs, potholes, damaged streets, miscellaneous obstructions and the like. The degree of impact, guard impact location and travel area can be logged for further analysis. Certainly, if the safety guard needs to be shifted for maintenance or other reasons, the controller can be so instructed or overridden to pivot or swing the guard in order to readily gain access under the vehicle.

Although described with reference to preferred embodiments of the invention, it should be readily understood that various changes and/or modifications can be made to the invention without departing from the spirit thereof. For instance, the particular geometry of the guard and/or mounting structure can vary, as well as the materials from which the guard and/or mounting structure are made. Certainly, the safety guard assembly of the invention can be used in combination with other guard structure. In addition, the guard itself could include caution logos, particularly of reflective and/or fluorescent colors, or lighting to further the safety function. In fact, the guard can include lighting itself, such as a perimeter pattern of light projected from the guard to the road, sidewalk, etc., to emphasize the potential for danger.

The invention claimed is:
1. A vehicle comprising:
a body having a front end portion and a side panel portion;
a pair of front steerable wheels spaced in a transverse direction of the body of the vehicle;
at least one pair of transversely spaced rear wheels which are longitudinally spaced from the front steerable wheels;
a door provided along the at least one side panel;
a safety guard extending downward from the body along one of the front end portion and the side panel portion for engaging animate and inanimate objects in order to prevent the objects from going under the vehicle, said safety guard being both pivotally attached to and separately, vertically shiftable relative to the body; and
a system for shifting the safety guard relative to the body, said system including a plurality of sensors and a controller for automatically shifting the safety guard relative to the body based on one or more signals received from the plurality of sensors.

2. The vehicle according to claim 1, wherein the safety guard is pivotally attached to the body for movement about a substantially horizontal axis such that, upon deflection when engaged, at least part of the safety guard can pivot under the body.

3. The vehicle according to claim 2, further comprising at least one member biasing the safety guard laterally outward relative to the body.

4. The vehicle according to claim 1, wherein the system further comprises a plurality of actuators acting between the body and the safety guard for vertically shifting the safety guard relative to the body in order to vary a distance between the safety guard and a supporting surface for the vehicle.

5. The vehicle according to claim 4, wherein the plurality of actuators are constituted by one or more of fluid pressure, electric and magnetic actuators.

6. The vehicle according to claim 4, wherein the system is configured to permit manually controlling the plurality of actuators to vertically shift the safety guard relative to the body.

7. The vehicle according to claim 4, wherein the plurality of sensors is configured to monitor vehicle operating conditions and the controller is configured to automatically vertically shift the safety guard relative to the body based on the one or more signals received from at least one of the plurality of sensors.

8. The vehicle according to claim 7, wherein the system receives signals from at least one of a bump signal generator, satellite imaging, stored road condition information, and logged data from previous travels over the road.

9. The vehicle according to 1, wherein the plurality of sensors employs at least one of optical, laser, sonar and radar sensors.

10. The vehicle according to claim 1, further comprising a warning system for signaling safety guard engagement with an animate or inanimate object, said warning system employing at least one of audible and visual signaling.

11. A method of a controlling a safety guard extending downward from one of a front end portion and a side panel portion of a body of a vehicle having a pair of front steerable wheels spaced in a transverse direction of the body of the vehicle, at least one pair of transversely spaced rear wheels longitudinally spaced from the front steerable wheels, and a door provided along the at least one side panel, said method comprising automatically shifting the safety guard relative to the body based on signals received from one or more of a plurality of sensors configured to sense vehicle operating conditions, said method including:
pivoting the safety guard in connection with engaging an animate or inanimate object in order to prevent the object from going under the vehicle; and vertically shifting the safety guard, separate from the pivoting, relative to the body to alter a distance between the safety guard and a supporting surface for the vehicle.

12. The method of claim 11 wherein, upon deflection when engaged, the safety guard is pivoted under the body about a substantially horizontal axis.

13. The method of claim 12, further comprising biasing the safety guard laterally outward relative to the body.

14. The method of claim 11, further comprising activating a plurality of actuators acting between the body and the safety guard to vertically shift the safety guard relative to the body.

15. The method of claim 14, wherein the safety guard is vertically shifted relative to the body by activating one or more of fluid pressure, electric and magnetic actuators.

16. The method of claim 14, wherein the plurality of actuators are manually activated to vertically shift the safety guard relative to the body.

17. The method of claim 14, wherein the plurality of actuators are automatically controlled to vertically shift the safety guard relative to the body based on signals received from the plurality of sensors monitoring variations in the supporting surface over which the vehicle travels.

18. The method of claim 17, further comprising vertically shifting the safety guard relative to the body based on signals received from at least one of a bump signal generator, satellite imaging, stored road condition information, and logged data from previous travels over the supporting surface.

19. The method of claim 11, wherein the signals are received from at least one of optical, laser, sonar and radar sensors.

20. The method of claim 11, further comprising operating a warning system, employing at least one of audible and visual signaling, to signal safety guard engagement with an animate or inanimate object.

* * * * *